(12) United States Patent
Ahn et al.

(10) Patent No.: US 8,908,352 B2
(45) Date of Patent: Dec. 9, 2014

(54) CHIP TYPE LAMINATED CAPACITOR

(71) Applicant: Samsung Electro-Mechanics Co., Ltd., Suwon (KR)

(72) Inventors: Young Ghyu Ahn, Gyunggi-do (KR); Byoung Hwa Lee, Gyunggi-do (KR); Min Cheol Park, Gyunggi-do (KR); Young Hoon Song, Gyunggi-do (KR); Mi Hee Lee, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 141 days.

(21) Appl. No.: 13/693,947

(22) Filed: Dec. 4, 2012

(65) Prior Publication Data

US 2013/0094123 A1    Apr. 18, 2013

Related U.S. Application Data

(63) Continuation of application No. 13/531,242, filed on Jun. 22, 2012, now Pat. No. 8,351,181.

(30) Foreign Application Priority Data

Jun. 23, 2011    (KR) .......................... 10-2011-0061345

(51) Int. Cl.
*H01G 4/06*    (2006.01)
*H01G 2/06*    (2006.01)
(Continued)

(52) U.S. Cl.
CPC ............. *H01G 4/1272* (2013.01); *H01G 2/065* (2013.01); *H01G 4/005* (2013.01); *H01G 4/30* (2013.01); *H01G 4/232* (2013.01); *H01G 4/228* (2013.01); *H01G 4/12* (2013.01)
USPC .................. 361/321.1; 361/301.2; 361/301.4; 361/303; 361/306.1; 361/321.2

(58) Field of Classification Search
CPC ........... H01G 4/005; H01G 4/30; H01G 4/12; H01G 4/228; H01G 4/232
USPC ...................... 361/321.1, 321.2, 301.2, 301.4, 361/303–305, 306.1, 306.3, 311–313
See application file for complete search history.

(56) References Cited

U.S. PATENT DOCUMENTS 5,774,326 A    6/1998    McConnelee et al.
6,195,249 B1    2/2001    Honda et al.
(Continued)

FOREIGN PATENT DOCUMENTS

JP    56-91433 U    7/1981
JP    61-162037 U    10/1986
(Continued)

OTHER PUBLICATIONS

Japanese Office Action issued in Japanese Application No. 2012-140668 dated Apr. 22, 2014, w/English translation.
(Continued)

*Primary Examiner* — Nguyen T Ha
(74) *Attorney, Agent, or Firm* — McDermott Will & Emery LLP

(57) ABSTRACT

There is provided a chip type laminated capacitor including: a ceramic body formed by laminating a dielectric layer having a thickness equal to 10 or more times an average particle diameter of a grain included therein and being 3 μm or less; first and second outer electrodes; a first inner electrode having one end forming a first margin together with one end surface of the ceramic body at which the second outer electrode is formed and the other end leading to the first outer electrode; and a second inner electrode having one end forming a second margin together with the other end surface of the ceramic body at which the first outer electrode is formed and the other end leading to the second outer electrode, wherein the first and second margins have different widths under a condition that they are 200 μm or less.

12 Claims, 8 Drawing Sheets

(51) Int. Cl.
*H01G 4/005* (2006.01)
*H01G 4/12* (2006.01)
*H01G 4/30* (2006.01)
*H01G 4/232* (2006.01)
*H01G 4/228* (2006.01)

(56) References Cited

U.S. PATENT DOCUMENTS

| | | | |
|---|---|---|---|
| 6,205,015 | B1 | 3/2001 | Wada et al. |
| 6,377,439 | B1 * | 4/2002 | Sekidou et al. ............... 361/303 |
| 6,437,969 | B2 | 8/2002 | Mizuno et al. |
| 6,853,536 | B2 * | 2/2005 | Nakamura et al. ......... 361/321.4 |
| 6,947,276 | B2 * | 9/2005 | Hirata et al. ................ 361/306.3 |
| 7,206,187 | B2 * | 4/2007 | Satou ........................... 361/309 |
| 8,288,301 | B2 * | 10/2012 | Ishihara ........................ 501/137 |
| 8,383,535 | B2 * | 2/2013 | Yamaguchi ................... 501/138 |
| 2005/0094351 | A1 | 5/2005 | Kobayashi |

FOREIGN PATENT DOCUMENTS

| | | |
|---|---|---|
| JP | 9-050935 A | 2/1997 |
| JP | 09-213560 A | 8/1997 |
| JP | 2000-150289 A | 5/2000 |
| JP | 2007-142342 A | 6/2007 |
| KR | 10-2005-0041904 | 5/2005 |

OTHER PUBLICATIONS

Office Action dated Sep. 26, 2014 issued in the related Korean Patent Application No. 10-2011-0061345.

* cited by examiner

CHIP TYPE LAMINATED CAPACITOR

CROSS-REFERENCE TO RELATED APPLICATIONS

This application is a Continuation of U.S. patent application Ser. No. 13/531,242, filed on Jun. 22, 2012, which claims the priority of Korean Patent Application No. 10-2011-0061345 filed on Jun. 23, 2011, in the Korean Intellectual Property Office, the disclosures of which are incorporated herein by reference.

BACKGROUND OF THE INVENTION

1. Field of the Invention

The present invention relates to a chip type laminated capacitor capable of reducing an acoustic noise while implementing miniaturization and high capacitance.

2. Description of the Related Art

With an increased demand for small-sized and multi-functional electronics, the demand for a compact, high-capacitance chip type laminated capacitors embedded in electronics has also increased.

In order to reduce the size of a chip type laminated capacitor and increase the capacitance thereof, there is a need to use a high-K material, for example, barium titanate, as a ceramic material forming a dielectric layer. When AC and DC voltages are applied to the chip type laminated capacitor having the dielectric layer formed of the high-K material and voltage variation occurs in the chip type laminated capacitor, a piezoelectric phenomenon is generated between inner electrodes and vibrations are generated.

These vibrations may be excessive in the case that the permittivity of the dielectric layer is high, when the size of the chip is relatively large, based on the same capacitance. The vibrations are transferred from an outer electrode of the chip type laminated capacitor to a circuit board on which the chip type laminated capacitor is mounted. In this case, the circuit board is vibrated to generate resonance.

That is, when the resonance generated by the vibrations of the circuit board is in a range of an audible frequency (20 to 20,000 Hz), the sound of the vibrations in the circuit board may give a person an unpleasant feeling, wherein the vibration sound is referred to as acoustic noise.

Acoustic noise generated due to a piezoelectric phenomenon in a laminated ceramic capacitor using a ferroelectric material therefore causes serious defects in some electronic devices.

The sound of the vibrations may be a factor in noise generation in electronic devices equipped with the laminated ceramic capacitor.

The present invention relates to a chip type laminated capacitor capable of reducing an acoustic noise while implementing miniaturization and high capacitance.

SUMMARY OF THE INVENTION

An aspect of the present invention provides a chip type laminated capacitor having reduced acoustic noise even in the case that a permittivity of a dielectric layer is lowered and a thickness thereof is remarkably reduced.

According to an embodiment of the present invention, there is provided a chip type laminated capacitor, including: a ceramic body formed by laminating a dielectric layer having a thickness equal to 10 or more times an average particle diameter of a grain included therein and being 3 μm or less; first and second outer electrodes formed at both ends of the ceramic body and having different polarities; a first inner electrode having one end forming a first margin together with one end surface of the ceramic body at which the second outer electrode is formed and the other end leading to the first outer electrode; and a second inner electrode having one end forming a second margin together with the other end surface of the ceramic body at which the first outer electrode is formed and the other end leading to the second outer electrode, wherein the first and second margins have different widths under a condition that they are 200 μm or less.

The first and second outer electrodes may include first and second band parts formed to have different widths on an L-T plane of the ceramic body, and a margin unbalance rate X of the first and second margins on an L-W plane of the ceramic body may satisfy the following Equation (1):

$$5\% \leq X = |M1/A1 - M2/A2|/\text{ave}(M1/A1, M2/A2) \leq 40\% \quad (1)$$

where M1 represents a length of the first margin, M2 represents a length of the second margin, A1 represents a length of the first band part, A2 represents a length of the second band part, and ave is a function representing an average, ave $(X, Y) = x+y/2$.

The first and second inner electrodes may include capacitance forming parts overlappingly opposed to each other, having the dielectric layer therebetween, and leading parts leading to the first and second outer electrodes. The third and fourth margins formed by both side ends of the capacitance forming parts and side parts of the ceramic body, respectively, on the L-W plane may be different from each other, and a margin unbalance rate Y of the third and fourth margins on a W-T plane may satisfy the following Equation (2):

$$5\% \leq Y = |M3 - M4|/\text{ave}(M3, M4) \leq 40\% \quad (2)$$

where M3 represents a length of the third margin, M4 represents a length of the fourth margin, and ave is a function representing an average, ave $(x, y) = x+y/2$.

A reduction rate Z of acoustic noise in consideration of the margin unbalance rates X and Y may satisfy the following Equation (3):

$$2.5\% \leq Z = |X \times Y| \leq 10.5\% \quad (3)$$

Fifth and sixth margins formed by both side ends of the leading parts and the side parts of the ceramic body, respectively, on the L-W plane may be different from each other.

According to another exemplary embodiment of the present invention, there is provided a chip type laminated capacitor, including: first and second outer electrodes covering both ends of a hexahedral ceramic body; and first and second inner electrodes including first and second capacitance forming parts overlappingly opposed to each other, having a dielectric layer therebetween, and first and second leading parts connecting the first and second outer electrodes to each other, wherein the first and second inner electrode are alternately laminated to upper and lower dummy dielectric layers, having the dielectric layer therebetween, and first and second margins formed by leading ends of the first and second capacitance forming parts and both ends of the ceramic body have different widths under a condition that they are 200 μm or less.

The first capacitance forming part and the first leading part may have the same width, and the second capacitance forming part and the second leading part may have substantially the same width.

A width of the first leading part may be substantially the same as that of the second leading part, and the widths of the first and second leading parts may be smaller than those of the first and second capacitance forming parts.

The first and second leading parts may have a width continuously reduced in a direction towards the first and second outer electrodes.

The first and second outer electrodes may include first and second band parts formed to have different widths on an L-T plane of the ceramic body.

A margin unbalance rate X of the first and second margins on an L-W plane of the ceramic body may satisfy the following Equation (4):

$$5\% \leq X = |M1/A1 - M2/A2|/\text{ave}(M1/A1, M2/A2) \leq 40\% \qquad (4)$$

where M1 represents a length of the first margin, M2 represents a length of the second margin, A1 represents a length of the first band part, A2 represents a length of the second band part, and ave is a function representing an average, ave (X, Y)=x+y/2.

Third and fourth margins formed by both side ends of the first and second capacitance forming parts and side parts of the ceramic body, respectively, on a W-T plane may be different from each other.

A margin unbalance rate Y of the third and fourth margins on the W-T plane may satisfy the following Equation (5):

$$5\% \leq Y = |M3 - M4|/\text{ave}(M3, M4) 40\% \qquad (5)$$

where M3 represents a length of the third margin, M4 represents a length of the fourth margin, and ave is a function representing an average, ave (x, y)=x+y/2.

A reduction rate Z of acoustic noise in consideration of the margin unbalance rates X and Y may satisfy the following Equation (6):

$$2.5\% \leq Z = |X \times Y| \leq 10.5\% \qquad (6).$$

Fifth and sixth margins formed by both side ends of the leading parts and side parts of the ceramic body, respectively, on an L-W plane may be different from each other.

According to another exemplary embodiment of the present invention, there is provided a chip type laminated capacitor, including: a ceramic body including first and second inner electrodes disposed to have a dielectric layer therebetween, the dielectric layer having a thickness of 3 μm or less; and first and second outer electrodes formed at both ends of the ceramic body and each connected to the first and second inner electrodes, wherein the number of grains disposed between the first and second inner electrodes is 10 or more in a thickness direction of the dielectric layer, and the following equation (7) is satisfied, $$5\% \leq X = |M1/A1 - M2/A2|/\text{ave}(M1/A1, M2/A2) \leq 40\% \qquad (7)$$

where M1 represents a margin (a first margin) formed between a leading end of the first inner electrode and one end surface of the ceramic body at which the second outer electrode is formed, M2 represents a margin (a second margin) formed between a leading end of the second inner electrode and one end surface of the ceramic body at which the first outer electrode is formed, A1 and A2 represent a length of first and second band parts of the first and second outer electrodes formed inwardly from both ends of the ceramic body, respectively, and ave is a function representing an average, ave (X, Y)=x+y/2.

The first and second inner electrodes may include capacitance forming parts overlappingly opposed to each other, having the dielectric layer therebetween, and leading parts leading to the first and second outer electrodes, third and fourth margins formed by both side ends of the capacitance forming parts and side parts of the ceramic body, respectively, on the L-W plane may be different from each other, and a margin unbalance rate Y of the third and fourth margins on the W-T plane may satisfy the following Equation (8):

$$5\% \leq Y = |M3 - M4|/\text{ave}(M3, M4) \leq 40\% \qquad (8)$$

where M3 represents a length of the third margin, M4 represents a length of the fourth margin, and ave is a function representing an average, that is, the ave (x, y)=x+y/2.

A reduction rate Z of acoustic noise in consideration of the margin unbalance rates X and Y may satisfy the following condition (9):

$$2.5\% \leq Z = |X \times Y| \leq 10.5\% \qquad (9).$$

Fifth and sixth margins formed by both side ends of the leading parts and the side parts of the ceramic body, respectively, on the L-W plane may be different from each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
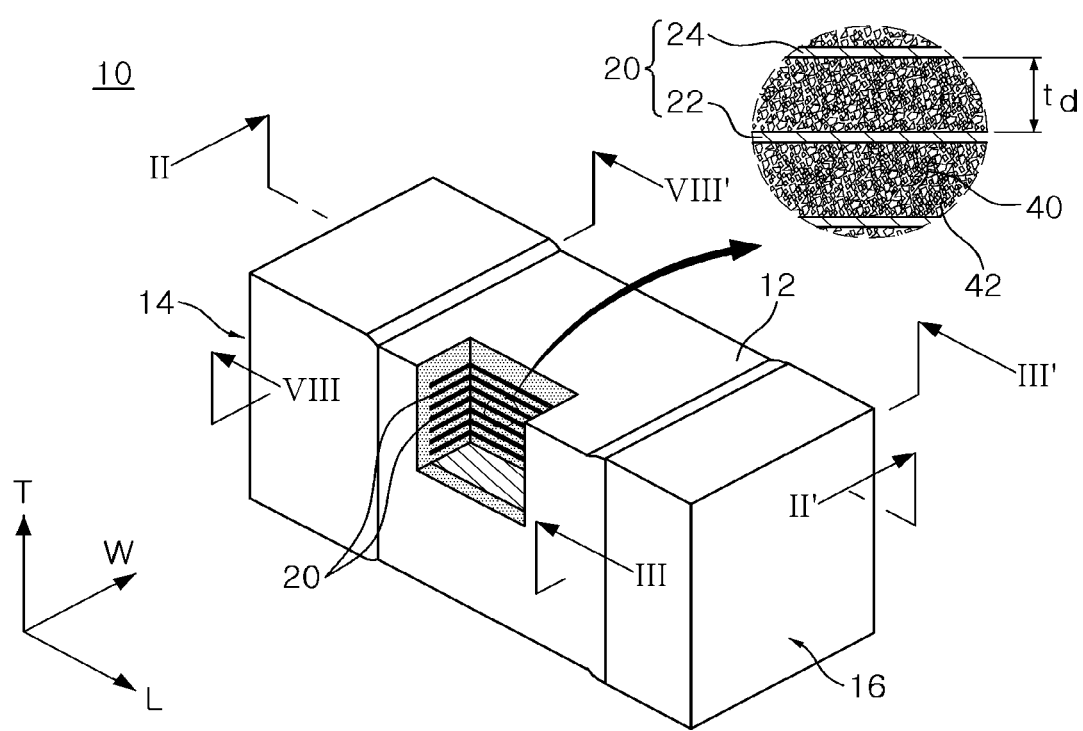
FIG. 1 is a partially cut-away, perspective view schematically showing a chip type laminated capacitor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention Further, like reference numerals will be used to designate like components having similar functions throughout the drawings within the scope of the present invention.

Chip Type Laminated Ceramic Capacitor

Figure 2:
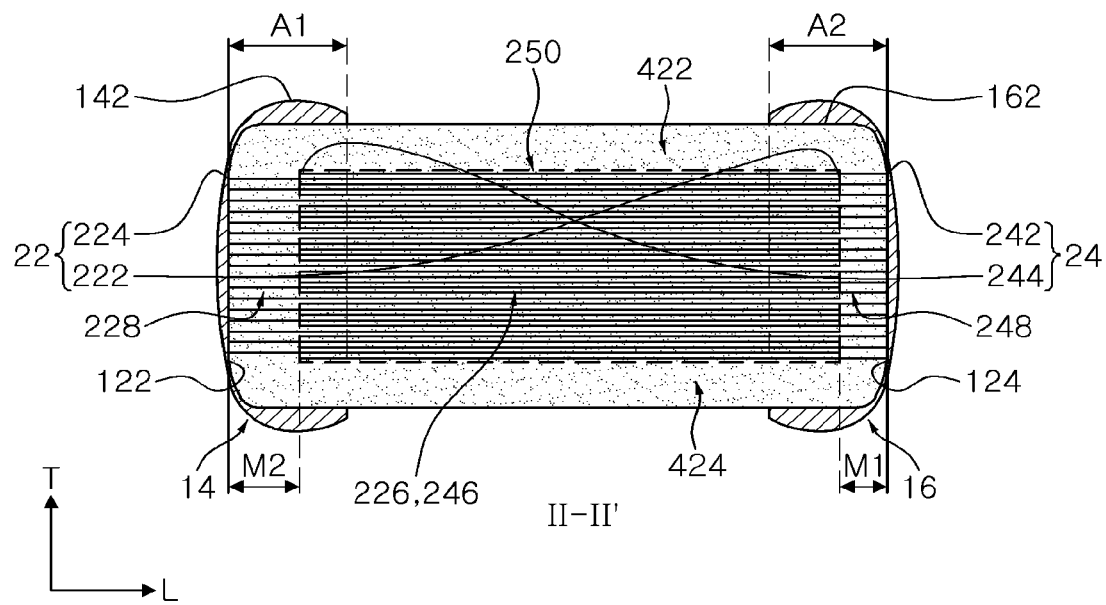
FIG. 2 is a schematic cross-sectional view taken along line II-II' of FIG. 1.
Figure 3:
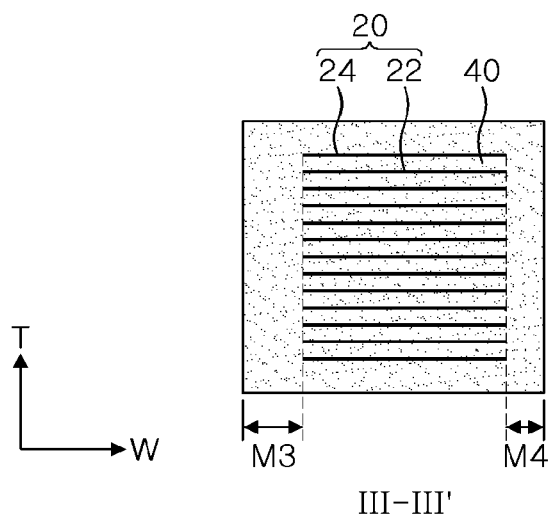
FIG. 3 is a schematic cross-sectional view taken along line of FIG. 1.
Figure 4:
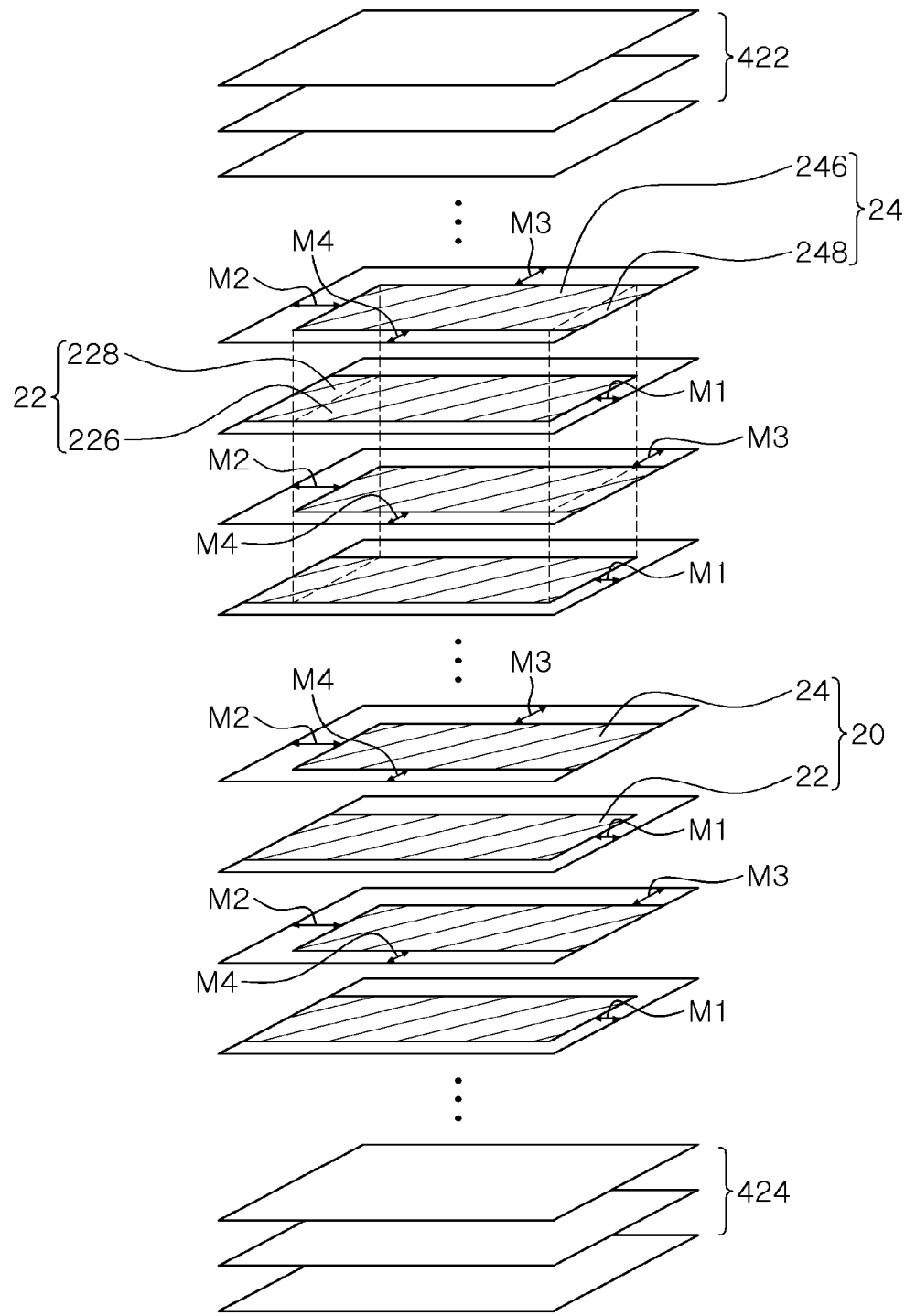
FIG. 4 is an exploded perspective view schematically showing the chip type laminated capacitor of FIG. 1.

FIG. 1 is a partially cut-away, perspective view schematically showing a chip type laminated capacitor according to an embodiment of the present invention, FIG. 2 is a schematic cross-sectional view taken along line II-II' of FIG. 1, FIG. 3 is a schematic cross-sectional view taken along line III-III' of FIG. 1, and FIG. 4 is an exploded perspective view schematically showing the chip type laminated capacitor of FIG. 1.

Referring to FIGS. 1 to 4, a chip type laminated ceramic capacitor 10 may include a ceramic body 12, first and second outer electrodes 14 and 16, and inner electrodes 20.

The ceramic body 12 may be manufactured by applying a conductive paste so as to form the inner electrodes 20 on a ceramic green sheet and laminating and firing the ceramic green sheet on which the inner electrodes 20 are formed. The ceramic body 12 may be formed by repeatedly laminating a plurality of dielectric layers 40 and inner electrodes 20.

The ceramic body 12 may be formed to have a hexahedral shape. Due to a firing shrinkage of a ceramic powder at the time of the chip firing, the ceramic body 12 does not have the hexahedral shape having a complete straight line, but may substantially have the hexahedral shape.

In order to elucidate embodiments of the present invention, defining a direction of the hexahedron, L, W, and T marked in FIG. 1 each represents a length direction, a width direction, and a thickness direction. In this case, the thickness direction may be used as the same concept as a laminated direction in which a dielectric layer is laminated.

The embodiment of FIG. 1 is the chip type laminated ceramic capacitor 10 having a rectangular parallelepiped shape of which the length direction is larger than the width or thickness direction.

As a material forming the dielectric layer 40, the ceramic powder having high-K may be formed so as to implement high capacitance. The ceramic powder is not limited thereto. For example, a barium titanate ($BaTiO_3$) based powder, strontium titanate ($SrTiO_3$) based powder, and the like, may be used.

In addition, when a grain size is relatively small after firing a chip type capacitor including a ferroelectric ceramic powder having a small average size, a ferroelectric permittivity may be reduced. The permittivity of the dielectric layer according to the embodiment of the present invention is not limited thereto.

In the embodiment of the present invention, the dielectric layer 40 has a thickness td equal to or less than 3 μm and an average size of a ceramic grain 42 forming the dielectric layer 40 may be equal to or less than 0.3 μm. That is, the dielectric layer 40 may have a thickness equal to 10 or more times an average particle diameter of the grain 42 included in a single dielectric layer 40 of the fired chip type laminated ceramic capacitor 10.

In this case, the thickness td of the dielectric layer 40 may refer to an average thickness of the single dielectric layer 40 which is disposed between the inner electrodes 20.

The thickness of the dielectric layer 40 may be measured by scanning a longitudinal cross section of the ceramic body 12 in an image type using a scanning electron microscope (SEM), as shown in FIG. 2. For example, the thickness of any dielectric layer 40 extracted from the image obtained by scanning a length and thickness direction (L-T) cross section cut at a central portion in a width direction W of the ceramic body 12 by the scanning electron microscope (SEM) may be measured at 30 points which are at equidistance in a longitudinal direction, such that the average value of the dielectric layer 40 may be measured. The 30 points at equidistance may be measured in a capacitance forming part that indicates an area in which first and second inner electrodes 22 and 24 overlap each other. In addition, when the average value of the thickness of the dielectric layer is measured by extending to more than 10 dielectric layers 40, the thickness of the dielectric layer may be more generalized.

In addition, the thickness of the dielectric layer 40 may be measured even in the images obtained by scanning the cross section in the width and thickness direction W-T from the central portion in the longitudinal direction L using the scanning electron microscope.

In this case, the central portion of the width direction W or the length direction L of the ceramic body 12 may be defined as a point within a range of 30% of the width or the length of the ceramic body 12 at the center point of the width direction W or the length direction L of the ceramic body 12.

Meanwhile, an average size of the grain 42 of the dielectric layer 40 may be measured by analyzing a cross section photograph of the dielectric layer extracted by the scanning electron microscope (SEM). For example, the average size of the grain 42 of the dielectric layer 40 may be measured by using grain size measurement software that supports the average size standard measurement method of the grain defined in American Society for Testing and Materials (ASTM) E112.

According to the embodiment of the present invention, the ceramic permittivity may be reduced by reducing the average size of the grain 42. Further, a relatively large number of dielectric layers 40 may be laminated on the same size of chip by setting the thickness of the dielectric layer 40 to be 3 μm or less. Therefore, the high capacitance may be implemented in the small-sized chip.

The inner electrode 20 may include the first inner electrode 22 and the second inner electrode 24, wherein the first and second inner electrodes 22 and 24 may be electrically connected to the first and second outer electrodes 14 and 16.

Meanwhile, in order to reduce the acoustic noise, the low-K may be implemented by reducing the average size of the grain 42 within the dielectric layer 40 while reducing the thickness td of the dielectric layer 40.

As described above, when the low-K of the chip type laminated ceramic capacitor 10 is implemented by reducing the thickness td of the dielectric layer 40 and the average size of the grain, the acoustic noise may be reduced.

However, the reduction effect in acoustic noise is remarkably reduced in the chip type laminated ceramic capacitor 10 manufactured so that the distance between the first and second inner electrodes 22 and 24 within the ceramic body 12, that is, the thickness of the dielectric layer 40 is set to be 3 μm or less and the number of grains within the dielectric layer 40 is 10 or more.

This can be more appreciated from the following Table 1.

TABLE 1

| NO. | Thickness of Dielectric (td, μm) | Grain Size (Dc, μm) | td/Dc | Vibration Sound (dB) |
|-----|----------------------------------|---------------------|-------|----------------------|
| 1   | 4.3                              | 0.68                | 6.3   | 43.7                 |
| 2   |                                  | 0.58                | 7.4   | 43.1                 |
| 3   |                                  | 0.43                | 10.0  | 36.3                 |
| 4   |                                  | 0.26                | 16.5  | 33.1                 |
| 5   | 2.8                              | 0.59                | 4.7   | 43.2                 |
| 6   |                                  | 0.45                | 6.2   | 42.1                 |
| 7   |                                  | 0.26                | 10.8  | 41.0                 |
| 8   |                                  | 0.16                | 17.5  | 40.5                 |

TABLE 1-continued

| NO. | Thickness of Dielectric (td, μm) | Grain Size (Dc, μm) | td/Dc | Vibration Sound (dB) |
|---|---|---|---|---|
| 9 | 1.9 | 0.60 | 3.2 | 43.6 |
| 10 | | 0.44 | 4.5 | 42.6 |
| 11 | | 0.25 | 7.6 | 41.7 |
| 12 | | 0.16 | 11.9 | 40.8 |

In this case, samples that are an experimental object were manufactured as follows.

First, a plurality of ceramic green sheets manufactured at a thickness meeting several experimental conditions was prepared by applying and drying slurries formed including powders such as barium titanate ($BaTiO_3$), and the like, to a carrier film, thereby forming the dielectric layer.

Next, a ceramic laminate was manufactured by forming the inner electrode on the green sheet using a conductive paste for a nickel inner electrode by a screen and then, laminating 370 layers and allowing a thickness of a cover layer to be differently set to be 10 to 100 μm.

The ceramic laminate was manufactured by isostatic pressing under a pressure condition of 1,000 kg f/cm² at 85° C.

The pressed ceramic laminate was cut in an individual chip form and the cut chip was subjected to a debinder while being maintained at 230° C. for 60 hours in atmosphere. Thereafter, the ceramic laminate was fired in a reduction atmosphere under an oxygen partial pressure of $10^{-11}$ atm to $10^{-10}$ atm lower than a Ni/NiO balance oxygen partial pressure so that the inner electrodes are not oxidized at 1200° C. The post-firing chip size was 3.2 mm×1.6 mm×1.6 mm (L×W×T) and the grain size Dc and the thickness td of the dielectric layer was shown in the above Table.

Referring to Table 1, when the low-K is implemented by reducing the grain size under the condition that the dielectric thickness is 4.3 μm like samples 1 to 4, it could be appreciated that the magnitude in vibration sound is remarkably reduced. However, when the low-K is implemented by reducing the grain size under the condition that the dielectric thickness is about 3 μm or less like samples 5 to 12, it could be appreciated that the reduction effect in vibration sound is insignificant even in the case in which td/Dc, that is, a ratio of the grain size to the dielectric thickness is 1/10 or less.

Therefore, when the dielectric thickness is thin, it could be appreciated that the reduction effect in vibration sound may be further increased only in the case of adding separate conditions in addition to the reduction in the grain size.

According to the embodiment of the present invention, the first and second inner electrodes 22 and 24 may be alternately laminated repeatedly, having the dielectric layer 40 disposed therebetween. In FIG. 2, a cutting surface on the L-T plane defines, as an active layer 250, the entire portion in which the first and second inner electrode 22 and 24 overlap each other, having the single dielectric layer 40 disposed therebetween, dummy dielectric layers 422 and 424 defining the top and bottom in the thickness direction of the active layer 250 and protecting the active layer 250, and first and second leading parts 228 and 248 electrically connected to the first and second outer electrodes 14 and 16, as portions of the first inner electrode 22 and the second inner electrode 24 that do not configure the active layer 250.

In particular, each of portions of the first and second inner electrodes 22 and 24 forming the active layer 250 and contributing to forming capacitance may be defined as first and second capacitance forming parts 226 and 246.

In this configuration, when electric field is applied to the chip type laminated ceramic capacitor 10, the distortion deformation due to the piezoelectricity and the electrostriction occurs by the capacitance forming parts 226 and 246 forming the capacitance of the chip type laminated ceramic capacitor, and a margin part other than the capacitance forming parts 226 and 246 serves to suppress the distortion deformation.

The first and second outer electrodes 14 and 16 may be formed at both ends of the ceramic body 12 having a rectangular parallelepiped shape. The first and second outer electrodes 14 and 16 may have different polarities and may be electrically connected the first inner electrode 22 and the second inner electrode 24 facing each other, having the dielectric layer 40 disposed therebetween.

The first and second outer electrodes 14 and 16 may each be formed by extending inwardly from both ends of the ceramic body 12, when being viewed from the L-W plane and the L-T plane of the ceramic body 12.

As shown in FIG. 2, the parts extending from both ends 122 and 124 of the ceramic body 12, respectively, to the inner side in the longitudinal direction L of the ceramic body 12 may be referred to as first and second band parts 142 and 162. In this case, the widths of the first and second band parts 142 and 162 may be the same or different from each other.

In this case, the measurement of lengths A1 and A2 for the first and second band parts 142 and 162 will be described with reference to FIG. 11.

Figure 11:
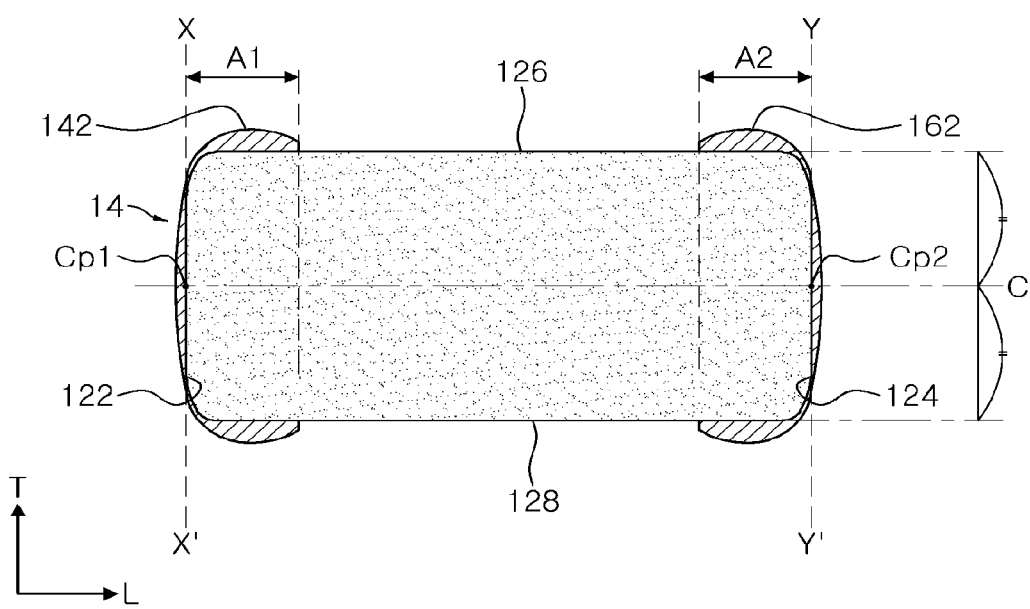
FIG. 11 is a schematic cross-sectional view so as to measure a length of a band part of the embodiment of the present invention.

FIG. 11 is a cross-sectional view schematically showing a cross section in the length and thickness direction (L-T) cut at the central portion in the width direction W of the ceramic body 12 as shown in FIG. 2.

Referring to the cross section in the L-T direction of the ceramic body 12, a length A1 of the first band part 142 of the first outer electrode 14 may be defined as a distance from a virtual line xx' vertically extending in a thickness direction to the first band part 142, at a central line C extending between central points Cp1 and Cp2 in a thickness direction of upper and lower end surfaces 126 and 128 in the thickness direction of the ceramic body 12.

In addition, the second band part 162 may also be defined as a distance from a virtual line yy' vertically extending in the thickness direction to the second band part 162 at the central line C.

In this case, the distance from the first band part 142 to the second band part 162 refers to an innermost point in the longitudinal direction formed in the ceramic body 12 of the first and second band parts 142 and 162.

Referring to FIGS. 2 and 4, lengths of a first margin M1 and a second margin M2 forming a leading end of the first and second capacitance forming parts 226 and 246 and both end surfaces 122 and 124 of the ceramic body 12 may be different from each other.

In this case, as the lengths of the first margin M1 and the second margin M2 forming the leading end of the first and second capacitance forming parts 226 and 246 and both end surfaces 122 and 124 of the ceramic body 12 are different from each other, when the vibration due to the distortion deformation of the chip type laminated ceramic capacitor 10 is transferred to the circuit board, the unbalance of force occurs. The unbalance of force may suppress the vibration of the circuit board and the acoustic noise generated from the chip type laminated ceramic capacitor 10 may be reduced.

In this case, the first and second margins M1 and M2 each do not exceed 200 μm for forming capacitance, thereby contributing to relatively high capacitance formation.

Referring to FIGS. 3 and 4, a third margin M3 and a fourth margin M4 forming the first and second capacitance forming parts 226 and 246 and the width direction end of the ceramic body 12 may also be different from each other.

The margin unbalance may reduce the acoustic noise generated from the chip type laminated ceramic capacitor 10, for the same reason as the first margin M1 and the second margin M2.

In the chip type laminated ceramic capacitor 10 for reducing the acoustic noise while implementing the miniaturization and the high capacitance of the embodiment of the present invention, the acoustic noise may be reduced and the margin is removed in the chip type laminated ceramic capacitor 10, when the first to fourth margins M1, M2, M3, and M4 and the first and second band parts 142 and 162 satisfy the following conditions, thereby improving the humidity resistance load NG rate that may be generated.

First, the unbalance rate X of the first and second margins M1 and M2 may satisfy the following Equation.

$$5\% \leq X = |M1/A1 - M2/A2|/\text{ave}(M1/A1, M2/A2) \leq 40\% \quad (1)$$

Where M1 may represent a length of a first margin, M2 may represent a length of a second margin, A1 may represent a length of the first band part, A2 may represent a length of the second band part, and ave may be a function representing an average. For example, ave $(X, Y) = x+y/2$.

When X is below 5%, the acoustic noise, that is, the vibration sound may be increased to 40 dB or more, and when X exceeds 40%, the vibration sound may effectively be reduced, but the humidity resistance load NG rate may be generated.

In addition, the margin unbalance rate Y for the third margin M3 and the fourth margin M4 may satisfy the following condition 2.

$$5\% \leq Y = |M3-M4|/\text{ave}(M3, M4) \leq 40\% \quad (2)$$

Where M3 may represent the length of the third margin, M4 may represent the length of the fourth margin, the ave may a function representing the average, and the ave $(x, y) = x+y/2$.

When Y is below 5%, the acoustic noise, that is, the vibration sound may be increased to 40 dB or more. When Y exceeds 40%, the vibration sound may effectively be reduced but the humidity resistance load NG rate may be generated.

In addition, the total margin unbalance rate Z in consideration of the margin unbalance rates X and Y may satisfy the following condition (3).

$$2.5\% \leq Z = |X \times Y| \leq 10.5\% \quad (3)$$

Where the total margin unbalance rate Z may be a variable that affects the reduction in the acoustic noise.

When Z is below 2.5%, the acoustic noise, that is, the vibration sound may be increased to 40 dB or more and when Z exceeds 10.5%, the vibration sound may effectively be reduced, but the humidity resistance load NG rate may be generated.

Hereinafter, the embodiment of the present invention will be described in more detail with reference to experimental data of Examples of the present invention and Comparative Examples.

Experimental Example

The laminated ceramic capacitor according to Examples of the present invention and Comparative Examples was manufactured.

The plurality of ceramic green sheets manufactured to have a thickness of 3.9 μm by applying and drying the slurries formed including the powder such as barium titanate ($BaTiO_3$), and the like, to the carrier film was prepared.

Next, the inner electrode was formed by applying the conductive paste for the nickel inner electrode to the ceramic green sheet using the screen for forming the patterns of which the margins are asymmetric on the ceramic green sheet.

The ceramic green sheets were laminated in 370 layers and the laminate was subjected to the isostatic pressing under the pressure condition of 1000 kgf/cm$^2$ at 85° C. The pressed ceramic laminate was cut in an individual chip form and the cut chip was subjected to a debinder while being maintained at 230° C. for 60 hours under the atmosphere.

Thereafter, the ceramic laminate was fired in a reduction atmosphere under an oxygen partial pressure of $10^{-11}$ atm to $10^{-10}$ atm lower than an Ni/NiO balance oxygen partial pressure so that the inner electrodes are not oxidized at 1200° C. The post-firing thickness of the dielectric layer was 2.7 μm and the average size of the grain of the post-firing dielectric layer was 0.27 μm, and the post-firing chip size was 3.2 mm×1.6 mm×1.6 mm (L×W×T).

Next, the laminated ceramic capacitor was manufactured by the processes, such as the outer electrode, the plating, and the like.

In this case, the samples of the laminated ceramic capacitor were variously manufactured according to the asymmetric rate of the margin part.

The following Tables 2 to 4 are tables that compare the vibration sound and the humidity resistance load NG rate according to the asymmetry of the margin parts for the cross section of the ceramic body. The noise such as the vibration sound was directly measured in an anechoic chamber by applying a pulse wave of 3Vpp to DC voltage corresponding to ½ of a rated voltage. Further, the humidity resistance NG rate represented, as a percentage, the number of samples having the insulating resistance falling to 2.5×10$^6$ or less within 100 hours by applying 25V DC voltage under 40° C. and a relative humidity of 95%, among 400 samples.

TABLE 2

| No. | M1 (μm) | M2 (μm) | A1 (μm) | A2 (μm) | X | Vibration Sound (dB) | Humidity Resistance NG Rate |
|---|---|---|---|---|---|---|---|
| 1* | 127.6 | 127.8 | 582.2 | 580.6 | 0.4% | 41.3 | 0.0% |
| 2* | 126.0 | 129.5 | 578.0 | 585.4 | 1.5% | 40.8 | 0.0% |
| 3 | 123.3 | 130.7 | 578.2 | 583.1 | 5.0% | 34.6 | 0.0% |
| 4 | 119.9 | 136.7 | 581.6 | 579.0 | 13.6% | 34.0 | 0.0% |
| 5 | 110.9 | 145.4 | 583.9 | 587.1 | 26.3% | 33.3 | 0.0% |
| 6 | 103.4 | 154.0 | 595.2 | 590.5 | 40.0% | 32.5 | 0.0% |
| 7* | 92.0 | 164.4 | 580.0 | 576.2 | 57.1% | 31.6 | 2.0% |
| 8* | 83.4 | 170.7 | 574.3 | 574.9 | 68.6% | 31.1 | 5.0% |

*Comparative Examples, M1, M2: first and second margins at the L-T cutting surface,
A1 and A2: the band parts of the outer electrodes extending inwardly from ends of the ceramic body,
X: the margin unbalance rate of M1 and M2.
X = |M1/A1 − M2/A2|/ave(M1/A1, M2/A2).

Referring to TABLE 2, samples 1, 2, 7, and 8 are Comparative Examples and samples 3 to 6 are Examples.

It could be appreciated that samples 3 to 6 according to the embodiment of the present invention generate the low vibration sound of 35 dB or less at the condition that the margin unbalance rate X of M1 and M2 is 5% to 40% and the phenomenon of causing defects due to the infiltration of humidity from the outside of the ceramic body 12 into the inner electrode is completely removed.

In the case of Comparative Examples 1 and 2 in which X is below 5%, the acoustic noise, that is, the vibration sound may be increased to 40 dB or more and in the case of Comparative Examples 7 and 8 in which X exceeds 40%, the vibration sound may be reduced, but the humidity resistance load NG rate was generated.

Consequently, Examples of the present invention can remarkably reduce the vibration sound and reduce the risk of the humidity resistance load NG rate, as compared with Comparative Examples.

TABLE 3

| No. | M3 (μm) | M4 (μm) | Y | Vibration Sound (dB) | Humidity Resistance load NG Rate |
|---|---|---|---|---|---|
| 11* | 102.4 | 102.6 | 0.2% | 41.4 | 0.0% |
| 12* | 101.0 | 103.2 | 2.2% | 40.6 | 0.0% |
| 13 | 99.4 | 104.5 | 5.0% | 34.3 | 0.0% |
| 14 | 94.7 | 109.6 | 14.6% | 33.8 | 0.0% |
| 15 | 90.1 | 114.5 | 23.9% | 33.1 | 0.0% |
| 16 | 82.3 | 123.5 | 40.0% | 32.5 | 0.0% |
| 17* | 72.5 | 133.0 | 58.9% | 31.9 | 3.0% |
| 18* | 63.2 | 142.1 | 76.9% | 31.0 | 8.0% |

*Comparative Example, M3, M4: the third and fourth margins at the W-T cutting surface and Y: the margin unbalance rate of M3 and M4 Y = |M2 − M1|/ave(M1, M2).

Referring to Table 3, samples 11, 12, 17, and 18 are Comparative Examples and samples 13 to 16 are Examples.

It could be appreciated that samples 13 to 16 according to the embodiment of the present invention generate the low vibration sound of 35 dB or less at the condition that the margin unbalance rate Y of M3 and M4 is 5% to 40% and the phenomenon of causing defects due to the infiltration humidity from the outside of the ceramic body 12 into the inner electrode is completely removed.

In the case of Comparative Examples 11 and 12 in which Y is below 5%, the acoustic noise, that is, the vibration sound may be increased to 40 dB or more and in the case of Comparative Examples 17 and 18 in which Y exceeds 40%, the vibration sound may be reduced, but the humidity resistance load NG rate is generated.

Consequently, Examples of the present invention can remarkably reduce the vibration sound and reduce the risk of the humidity resistance load NG rate.

other, having the thin dielectric layer disposed therebetween could be confirmed through the L-W plane photograph of the single ceramic body.

Referring to Table 4, samples 21, 22, 27, and 28 are Comparative Examples and samples 23 to 26 are Examples.

It could be appreciated that samples 23 to 26 corresponding to the embodiment of the present invention generate the low vibration sound of 35 dB or less at the condition that the total margin unbalance rate Z is 2.5% to 10% and the phenomenon of causing defects due to the infiltration of humidity from the outside of the ceramic body 12 into the inner electrode is completely removed.

In the case of Comparative Examples 21 and 22 in which Z is below 2.5% the acoustic noise, that is, the vibration sound may be increased to 40 dB or more and in the case of Comparative Examples 27 and 28 in which Z exceeds 10.5%, the vibration sound may be reduced, but the humidity resistance load NG rate is generated.

Consequently, Examples of the present invention can remarkably reduce the vibration sound and reduce the risk of the humidity resistance load NG rate, as compared with Comparative Examples.

Modified Example

Figure 5:
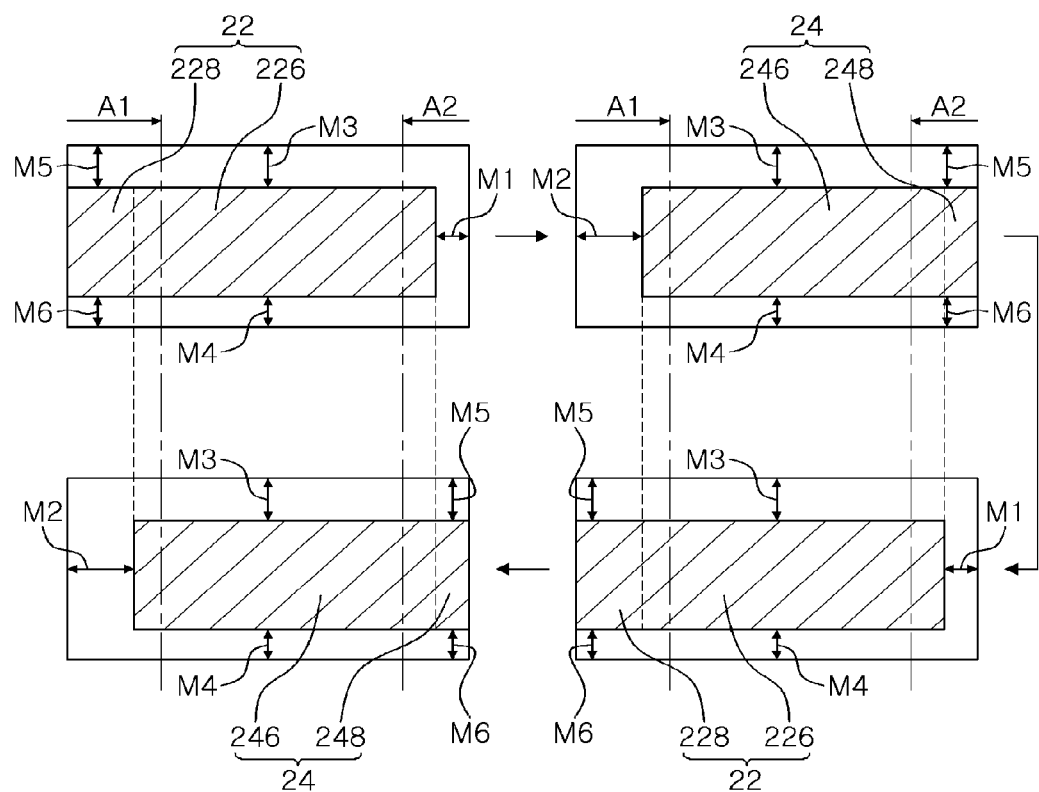
FIG. 5 is a plan view schematically showing a first embodiment of a shape in which inner electrodes formed on a dielectric layer are laminated.
Figure 8:
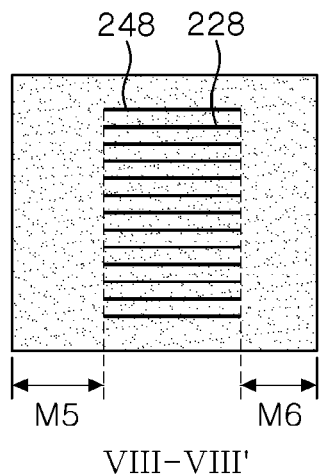
FIG. 8 is a cross-sectional view taken in direction W-T of a shape in which inner electrodes of FIG. 5 are led and is a cross-sectional view taken along line VIII-VIII' of FIG. 1, where outer electrodes are removed.

FIG. 5 is a plan view schematically showing a first embodiment of a shape in which inner electrodes formed on a dielectric layer are laminated and FIG. 8 is a cross-sectional view taken in direction W-T of a shape in which inner electrodes of FIG. 5 are led and is a cross-sectional view taken along line VIII-VIII' of FIG. 1, where outer electrodes are removed.

Figure 6:
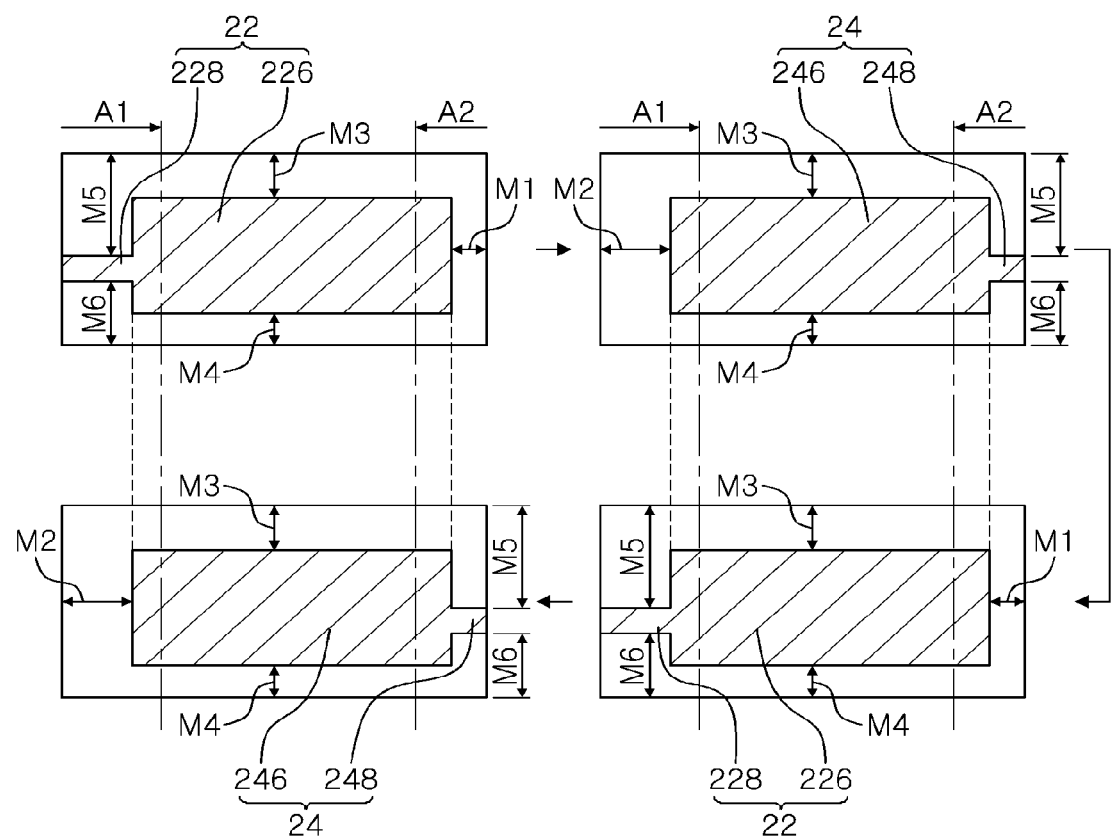
FIG. 6 is a plan view schematically showing a second embodiment of a shape in which inner electrodes formed on a dielectric layer are laminated.
Figure 9:
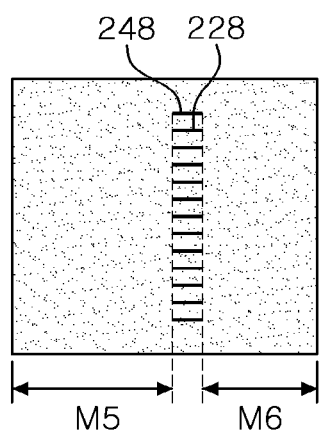
FIG. 9 is a cross-sectional view taken in direction W-T of a shape in which the inner electrodes of FIG. 6 are led and is a cross-sectional view taken along line VIII-VIII' of FIG. 1, where outer electrodes are removed.

FIG. 6 is a plan view schematically showing a second embodiment of a shape in which inner electrodes formed on a dielectric layer are laminated and FIG. 9 is a cross-sectional view taken in direction W-T of a shape in which the inner electrodes of FIG. 6 are led and is a cross-sectional view taken along line VIII-VIII' of FIG. 1, where outer electrodes are removed.

Figure 7:
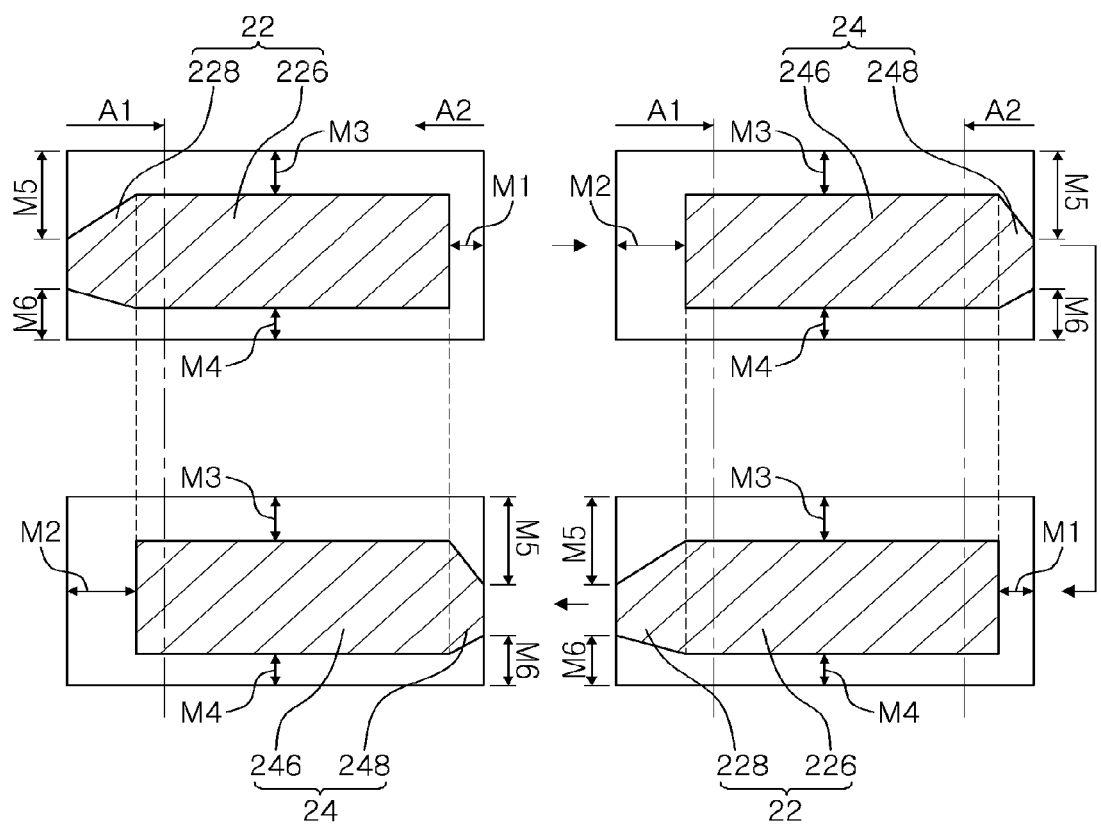
FIG. 7 is a plan view schematically showing a third embodiment of a shape in which inner electrodes formed on a dielectric layer are laminated.

In addition, FIG. 7 is a plan view schematically showing a third embodiment of a shape in which inner electrodes

TABLE 4

| No. | M1 (μm) | M2 (μm) | M3 (μm) | M4 (μm) | A1 (μm) | A2 (μm) | X | Y | Z | Vibration Sound (dB) | Humidity Resistance Load NG Rate |
|---|---|---|---|---|---|---|---|---|---|---|---|
| 21* | 127.6 | 127.8 | 102.4 | 102.6 | 583.0 | 579.4 | 0.8% | 0.2% | 0.0% | 41.1 | 0.0% |
| 22* | 123.6 | 130.4 | 100.2 | 104.1 | 580.2 | 585.1 | 4.5% | 0.2% | 0.0% | 40.7 | 0.0% |
| 23 | 117.0 | 138.1 | 93.5 | 109.9 | 579.8 | 586.4 | 15.4% | 16.1% | 2.5% | 33.5 | 0.0% |
| 24 | 114.5 | 139.3 | 89.2 | 114.8 | 570.2 | 575.2 | 18.7% | 25.1% | 4.7% | 32.7 | 0.0% |
| 25 | 110.2 | 146.1 | 87.8 | 117.0 | 591.4 | 587.5 | 28.7% | 28.5% | 8.2% | 32.0 | 0.0% |
| 26 | 107.9 | 146.1 | 85.3 | 119.5 | 578.6 | 576.4 | 30.5% | 33.4% | 10.2% | 31.4 | 0.0% |
| 27* | 100.2 | 155.2 | 79.4 | 125.5 | 582.4 | 588.4 | 42.1% | 45.0% | 18.9% | 31.0 | 2.0% |
| 28* | 90.5 | 164.2 | 70.2 | 135.0 | 590.4 | 592.3 | 57.6% | 63.2% | 36.4% | 30.3 | 5.0% |

*Comparative Example, M1, M2: first and second margins,
M3, M4: third and fourth margins,
A1 and A2: the band parts of the outer electrodes extending inwardly from ends of the ceramic body,
X: the margin unbalance rate of M1 and M2,
X = |M1/A1 − M2/A2|/ave(M1/A1, M2/A2),
Y: the margin unbalance rate of the M3 AND M4,
Y = |M2 − M1|/ave (M1, M2),
Z: total margin unbalance rate,
Z = |X × Y|.

The measurement of the lengths M1, M2, M3, and M4 of each margin part of the samples shown in Table 4 used the image of the cross section represented by polishing the ceramic body in the length and width directions L-W. In this case, the inner electrodes of two layers that overlap each formed on a dielectric layer are laminated and FIG. 10 is a cross-sectional view taken in direction W-T of a shape in which the inner electrodes of FIG. 7 are led and is a cross-sectional view taken along line VIII-VIII' of FIG. 1, wherein the outer electrodes are removed.

Similar to the embodiment of the present invention, embodiments of FIGS. 5 and 8 show the case in which the capacitance forming parts 226 and 246 and the leading parts 228 and 248 have the same width.

Figure 10:
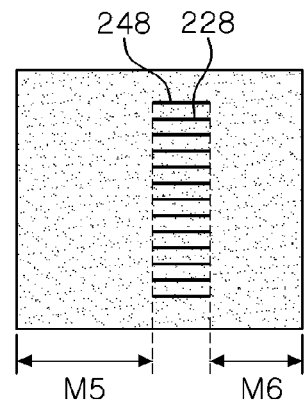
FIG. 10 is a cross-sectional view taken in direction W-T of a shape in which the inner electrodes of FIG. 7 are led and is a cross-sectional view taken along line VIII-VIII' of FIG. 1, wherein the outer electrodes thereof are removed.

Unlike the embodiment of FIGS. 5 and 8, the embodiment of FIGS. 6 and 9 and the embodiment of FIGS. 7 and 10 show the case in which the first and second capacitance forming parts 226 and 246 and the first and second leading parts 228 and 248 of the first and second inner electrodes 22 and 24 have a different width.

In the embodiment of FIGS. 6 and 9, the width of the first and second capacitance forming parts 226 and 246 and the width of the leading parts 228 and 248 were each formed uniformly and the width of the leading parts 228 and 248 was set to be reduced as compared with that of the first and second capacitance forming parts 226 and 248.

Further, the fifth margin M5 and the sixth margin M6 formed by the ends in the width direction of the first and second leading parts 228 and 248 and the ceramic body 12 on the L-W plane may also be formed to be different from each other.

The fifth margin M5 and the sixth margin M6 that are formed to be different from each other may add complementation force to vibration suppression force of the first to fourth margins M1, M2, M3, and M4 that are formed between the capacitance forming part and the outside surface of the ceramic body.

Meanwhile, the embodiment of FIGS. 7 and 10 shows the case in which the first and second capacitance forming parts 226 and 248 have the same width, but each of the first and second leading parts 228 and 248 may have a width reduced toward a direction towards both longitudinal ends. However, the fifth margin M5 and the sixth margin M6 may be formed to be different from each other by allowing the continuously reducing slope to be different.

Even in the case, similar to FIGS. 6 and 9, the fifth margin M5 and the sixth margin M6 that are formed to be different from each other may complement the vibration suppression force of the first to fourth margins M1, M2, M3, and M4 that are formed between the capacitance forming part and the outside surface of the ceramic body.

As set forth above, according to the chip type laminated capacitor according to the embodiment of the present invention, the acoustic noise may be remarkably reduced in the small-sized and high-capacitor chip type laminated capacitor of which the thickness of the dielectric layer having the low-K is particularly equal to or less than 3 μm.

While the present invention has been shown and described in connection with the embodiments, it will be apparent to those skilled in the art that modifications and variations can be made without departing from the spirit and scope of the invention as defined by the appended claims.

What is claimed is:

1. A chip type laminated capacitor comprising:
a first outer electrode covering a first end of a ceramic body;
a second outer electrode covering a second end of the ceramic body;
a first inner electrode including a first capacitance forming part and a first leading part, the first leading part being connected to the first outer electrode; and
a second inner electrode including a second capacitance forming part and a second leading part, the second capacitance forming part being overlapped with the first capacitance forming part, the second leading part being connected to the second outer electrode,
wherein a margin unbalance rate X on an L-W plane of the ceramic body satisfies the following Equation:

$$5\% \leq X = |M1/A1 - M2/A2|/ave(M1/A1, M2/A2) \leq 40\%$$

wherein M1 represents a length of a first margin defined by a length between an end of the first capacitance forming part and the second end of the ceramic body on the L-W plane,
M2 represents a length of a second margin defined by a length between an end of the second capacitance forming part and the first end of the ceramic body on the L-W plane,
A1 and A2 represent a length of first and second band parts of the first and second outer electrodes formed inwardly from the first and second ends of the ceramic body, respectively, on the L-W plane and
ave is a function representing an average, ave $(X, Y) = (x+y)/2$.

2. The chip type laminated capacitor of claim 1, wherein a thickness of a dielectric layer disposed between the first inner electrode and the second inner electrode is equal to 10 or more times an average size of grains of the dielectric layer.

3. The chip type laminated capacitor of claim 2, wherein the thickness of the dielectric layer is equal to 10 or more times an average size of grains of the dielectric layer.

4. The chip type laminated capacitor of claim 1, wherein a thickness of a dielectric layer disposed between the first inner electrode and the second inner electrode is 3 μm or less.

5. The chip type laminated capacitor of claim 1, wherein a margin unbalance rate Y on a W-T plane satisfies the following Equation:

$$5\% \leq Y = |M3 - M4|/ave(M3, M4) \leq 40\%$$

wherein M3 represents a length of a third margin defined by a length between a first side end of the first capacitance forming part and a first side end of the ceramic body on the W-T plane,
M4 represents a length of a fourth margin defined by a length between an second side end of the second capacitance forming part and the first end of the ceramic body on the W-T plane, and
ave is a function representing an average, ave $(X, Y) = (x+y)/2$.

6. The chip type laminated capacitor of claim 5, wherein a thickness of a dielectric layer disposed between the first inner electrode and the second inner electrode is equal to 10 or more times an average size of grains of the dielectric layer.

7. The chip type laminated capacitor of claim 5, wherein a thickness of a dielectric layer disposed between the first inner electrode and the second inner electrode is 3 μm or less.

8. The chip type laminated capacitor of claim 7, wherein the thickness of the dielectric layer is equal to 10 or more times an average size of grains of the dielectric layer.

9. The chip type laminated capacitor of claim 5, wherein a reduction rate Z of acoustic noise in consideration of the margin unbalance rates X and Y satisfies the following condition:

$$2.5\% \leq Z = |X \times Y| \leq 10.5\%.$$

10. The chip type laminated capacitor of claim 1, wherein a width of the first leading part is substantially the same as that of the second leading part, and the widths of the first and second leading parts are smaller than those of the first and second capacitance forming parts.

11. The chip type laminated capacitor of claim 1, wherein the first and second leading parts have a width continuously reduced in a direction towards the first and second outer electrodes.

12. The chip type laminated capacitor of claim 1, wherein the first and second outer electrodes include first and second band parts having different widths on an L-T plane of the ceramic body.

* * * * *